United States Patent [19]

Bauer et al.

[11] Patent Number: 5,176,044
[45] Date of Patent: Jan. 5, 1993

[54] DRIVE UNIT FOR A WIPER SYSTEM OF MOTOR VEHICLES

[75] Inventors: Kurt Bauer, Ingersheim; Wilhelm Dörr, Bietigheim-Bissingen; Reinhard Edele, Sachsenheim; Werner Pfitzenmaier, Besigheim; Christian Roth, Bietigheim-Bissingen; Eckhardt Schmid, Brackenheim, all of Fed. Rep. of Germany

[73] Assignee: SWF Auto-Electric GmbH, Beitigheim-Bissingen, Fed. Rep. of Germany

[21] Appl. No.: 913,584

[22] Filed: Jul. 14, 1992

Related U.S. Application Data

[60] Division of Ser. No. 830,960, Feb. 5, 1992, Pat. No. 5,142,939, which is a continuation of Ser. No. 393,920, Jul. 7, 1989, abandoned.

[30] Foreign Application Priority Data

Dec. 17, 1987 [DE] Fed. Rep. of Germany ....... 3738924

[51] Int. Cl.⁵ .................. F16C 3/04; F16H 21/18; B25G 3/28; A47L 1/00
[52] U.S. Cl. .................. 74/595; 74/42; 403/274; 15/250.27; 15/250.30; 29/520
[58] Field of Search .................. 74/519, 520, 522, 42, 74/43, 595; 15/250.13, 250.17, 205.27, 250.30; 403/274, 279, 284; 29/520

[56] References Cited

U.S. PATENT DOCUMENTS

| | | | |
|---|---|---|---|
| 2,067,967 | 1/1937 | Kniepen | 403/274 |
| 4,249,298 | 2/1981 | Kanamaru et al. | 403/274 X |
| 4,335,496 | 6/1982 | Kanamaru et al. | 403/274 X |
| 4,848,171 | 7/1989 | Steijger et al. | 74/42 |
| 4,878,398 | 11/1989 | Heinrich | 74/42 X |

FOREIGN PATENT DOCUMENTS

| | | | |
|---|---|---|---|
| 902964 | 1/1986 | Belgium | 403/274 |
| 1800600 | 8/1969 | Fed. Rep. of Germany | 403/274 |
| 3045395 | 7/1982 | Fed. Rep. of Germany | 403/274 |
| 3241551 | 5/1984 | Fed. Rep. of Germany | 403/274 |
| 55-94740 | 7/1980 | Japan | 403/274 |
| 56-105120 | 8/1981 | Japan | 74/572 |
| 60-88663 | 5/1985 | Japan | 74/42 |
| 407679 | 9/1966 | Switzerland | 403/274 |

Primary Examiner—Vinh T. Luong
Attorney, Agent, or Firm—J. Gordon Lewis; Robert P. Seitter

[57] ABSTRACT

A connection and two step method of manufacturing is disclosed for a drive unit for a wiper arm system which consists of a wiper shaft mounted in a bore through a crank arm. The wiper shaft is formed with a groove disposed within the thickness of the crank arm and material from one surface of the crank arm is displaced to form an annular recess which causes crank arm material adjacent the groove to be radially displaced into a groove formed in the wiper shaft to form an axial holding element. The radial distance R1 of the recess from the crank arm bore is substantially equal to the axial distance A1 of the groove below the one crank arm surface to facilitate the extruding process. Knurled areas on the shaft on either side of the groove are press fit into the crank arm bore as a first step in assembling the shaft to the crank arm, bringing a flange into abutment against the other surface of the crank arm.

1 Claim, 2 Drawing Sheets

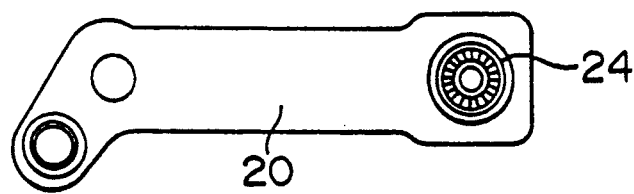
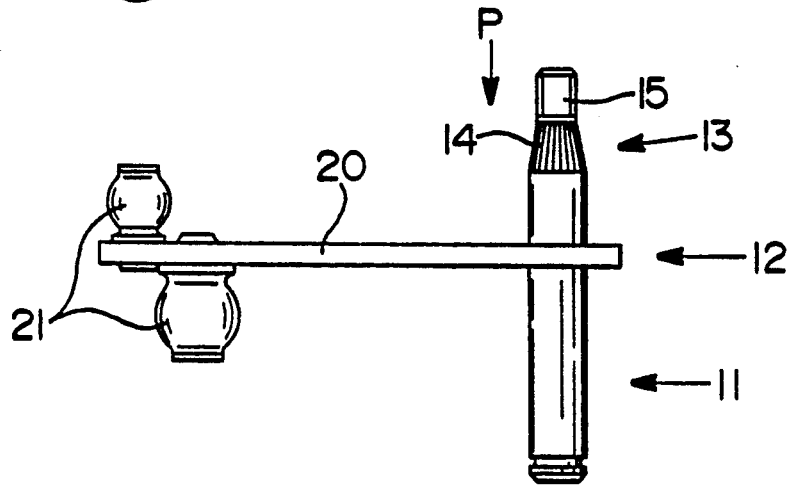
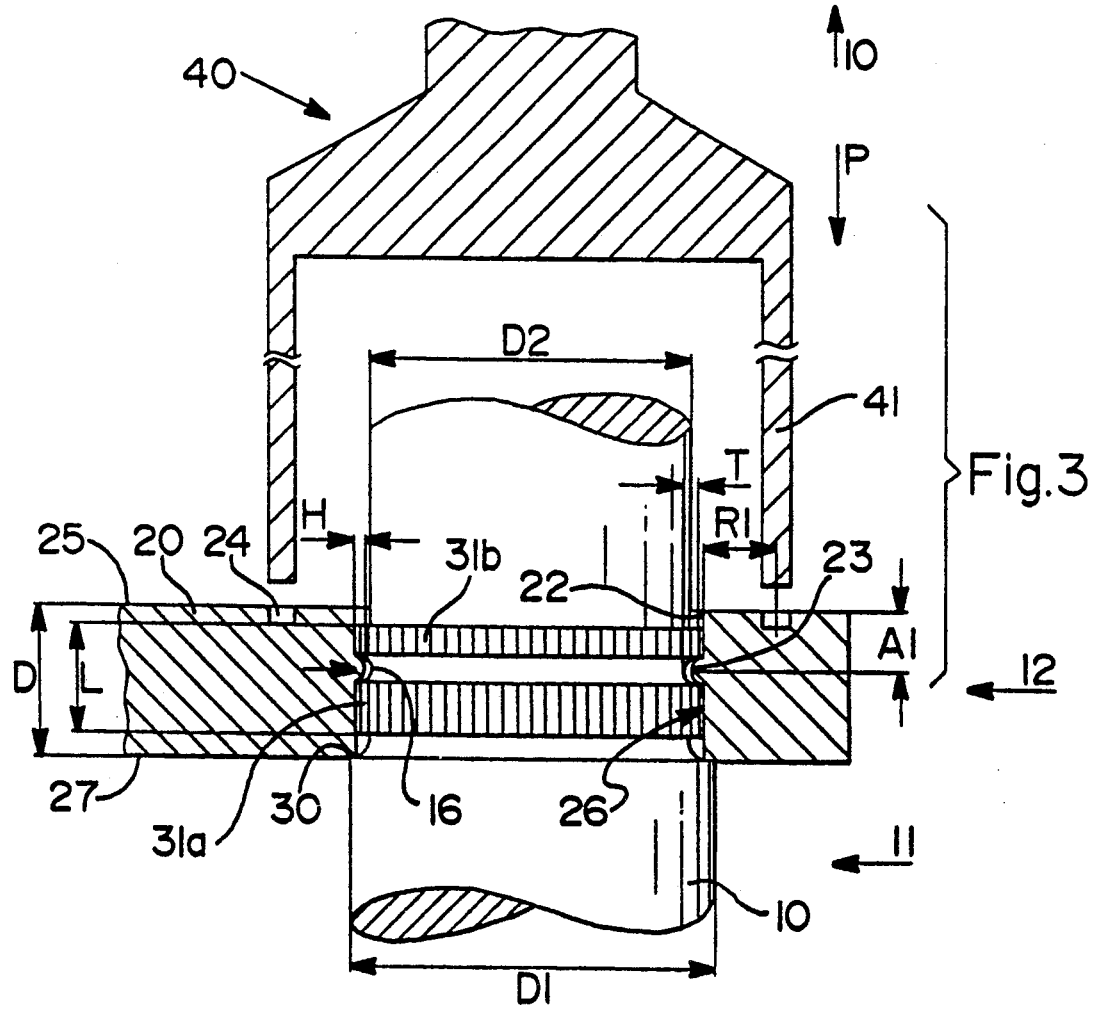

DRIVE UNIT FOR A WIPER SYSTEM OF MOTOR VEHICLES

CROSS-REFERENCE TO RELATED APPLICATION

This is a division of U.S. Ser. No. 07/830,960 filed on Feb. 5, 1992, now U.S. Pat. No. 5,142,939 which a continuation of U.S. Ser. No. 07/393,920 filed on Jul. 7, 1989 now abandoned.

BACKGROUND OF THE INVENTION

The invention relates to a drive unit for a wiper system of motor vehicles having a wiper shaft or pivot pin with a fastening section for connecting to a crank arm.

In wiper systems of motor vehicles several drive units are needed to transform the rotary motion of an electric motor into a pendular motion of a wiper. A problem generally experienced is how to fix a first element onto a crank arm or onto a crank, whereby the fastening area of the first element is anchored in a respective aperture of the crank arm. The first element could be, for instance, a wiper shaft or a pivot pin, especially a ball pivot pin.

A drive unit for wiper systems in which a crank arm is fixed in a middle fastening area of a wiper shaft is already known. The fastening section of the wiper shaft to which the wiper arm is connected is disposed on one side of this crank arm and is usually provided with a threaded section and a knurl. On the other side of the crank arm, a bearing section of the wiper shaft is rotatively located in a bearing bushing. In order to provide an unrotatable connection stable inform between the crank arm and the wiper shaft, the typical wiper shaft comprises an extending profiled section that is pressed into the respective aperture in the crank arm. In order to secure the crank arm in the axial direction of the wiper shaft, arresting shoulders serving as holding elements for the crank arm are punched out of this profiled section. Because of this profiled section in the middle of the wiper shaft it is relatively expensive to manufacture such a drive unit.

Drive units with a double ball pin anchored at a crank arm for being linked to further drive units which, for instance push rods, are also known. So far this pivot pin has been soldered to the crank arm in the fastening area.

SUMMARY OF THE INVENTION

The object of the present invention is to reduce the manufacturing costs of such a drive unit while at the same time guaranteeing sufficient stability of the connection between the wiper shaft or the pivot pin and the crank arm.

According to the invention this object is achieved by having a drive unit with a first element which has a ring groove out of the crank arm.

The invention is based on the idea that sufficiently stable security of position in the axial direction of the wiper shaft is achieved when the wiper shaft or the pivot pin is provided with a ring-groove and the holding element is formed out of the crank arm. Thus, as the embodiments in which the crank arm has to be fixed onto the first element approximately midway, i.e. onto the wiper shaft or a double pivot pin, this first element can be manufactured as a turn piece at low costs.

The basic idea of the present invention could be implemented in such a way that separate lugs acting as holding elements are formed out of the front sides of the crank arm. However, with the holding elements at the front sides of the crank arm the adjacent knurled section of the wiper shaft could be damaged. Therefore one preferred embodiment is provided with the holding element formed out of the surface area of the aperture of the crank arm at a distance from the front sides of the crank arm. When the drive unit is finally assembled, the means by which the crank arm is axially secured is not visible.

Thus, an especially stable connection is achieved when instead of separate holding elements, a surrounding bulge is formed which engages approximately radially into a ring-groove of the wiper shaft or pivot pin. Such a ring-like bulge can be formed by a so-called "ring wedging operation", in which a ring-like recess is worked into the front side of the crank arm by means of a ring-like die, which pushes material out of the surface area at the border of the recess. Then, the material pushed out of the surface area enters the ring-groove, which preferably has a cross-section in the shape of a half-circle so that stability is not reduced because of a grooving effect.

Experiments have shown that a holding element of this kind engaging into a ring-groove of the wiper shaft or pivot pin sufficiently ensures stability of the connection in the axial direction of the wiper shaft. Nevertheless, in the preferred embodiment an arresting flange onto which one front side of the crank arm lies in provided on the wiper shaft or pivot pin. On a wiper shaft this arresting flange more or less separates the bearing section from the fastening area to which the crank arm is attached since the diameter of the wiper shaft in the bearing section is bigger than in the two other sections or areas. As to such an embodiment the ring-like recess is worked into the front side of the crank arm not lying on the arresting flange. The advantage thereby is that the arresting flange can be used as stop member during the ring wedging operation. Furthermore, the diameter of the die does not depend on the bigger diameter of the bearing section of the wiper shaft.

A transfer of the torque from the crank arm to the wiper shaft is achieved when the wiper shaft is knurled in the fastening area and, preferably, also hardened, the wiper shaft being pressed onto this knurled fastening area. The extent of the torque transferred depends on the axial extension of the knurl, which is smaller than the thickness of the crank arm so that no fillings can be abrased during the pressing-in process. Best conditions are achieved when the ring-groove is provided within this knurled area so that there are knurled areas at both sides of the ring-groove, which areas, however, are of a different size. Thus, the biggest possible axial length of the knurl and a sufficient distance of the ring-groove from the one front side of the crank arm are ensured.

Furthermore, the invention relates to a method of manufacturing such a drive unit wherein the wiper shaft is preferably formed as a solid shaft or pivot pin having a preferably knurled fastening area that preferably presses into an aperture of the crank arm, and wherein afterwards a tool comprising a die concentrically arranged towards the wiper shaft or pivot pin is pushed against one front side of the crank arm and thereby creates a ring-like aperture in the crank arm in the axial direction of the wiper shaft or pivot pin and, consequently, produces a bulge which radially enters the ring-groove of the wiper shaft or pivot pin by pushing the respective material aside. Thus, the two operational steps—pressing the crank arm onto the wiper shaft or pivot pin and forming the bulge for securing the position axially—are executed in the same direction. Thus the assembling process is simplified and the manufacturing costs are also reduced.

BRIEF DESCRIPTION OF THE DRAWINGS

The invention and advantageous developments thereof are described by way of the embodiments shown in the drawing in which FIG. 1 is a side view of a driving gear, FIG. 2 is a view of the driving gear in the direction of Arrow P in FIG. 1, FIG. 3 is an enlarged partial sectional view of the connecting area between the crank and the wiper shaft.

DETAILED DESCRIPTION OF THE PREFERRED EMBODIMENTS

Figure 4:
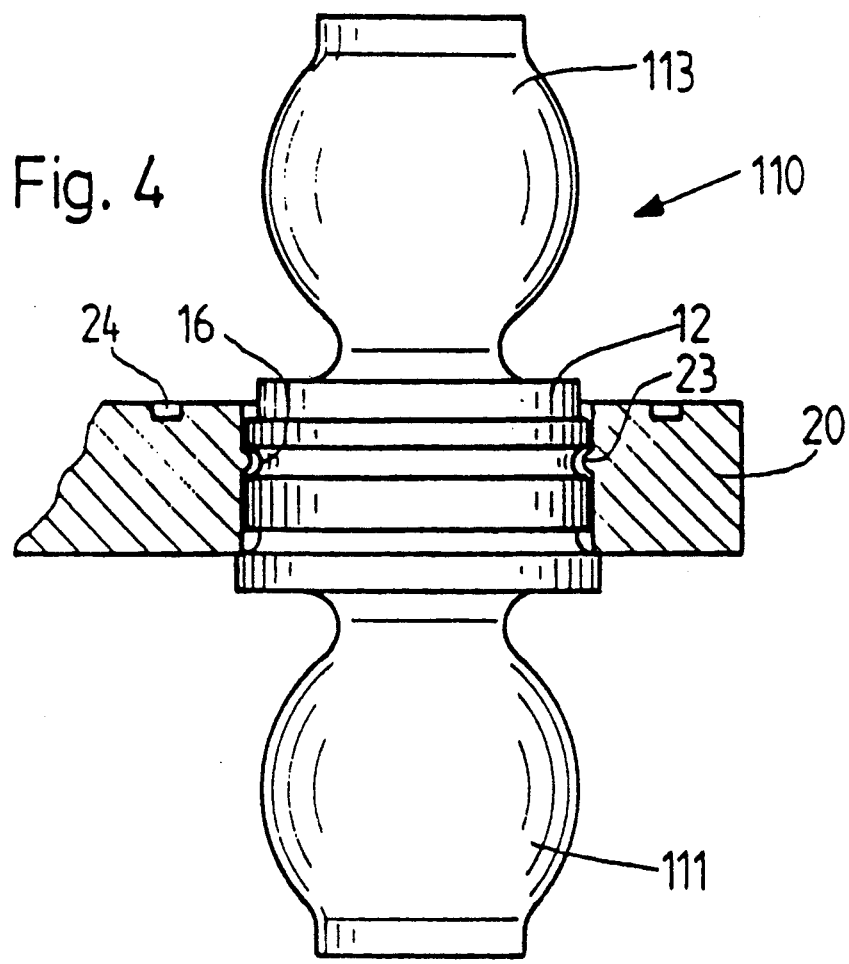
FIG. 4 is a sectional view of a drive unit comprising a pivot pin.

The wiper shaft 10 has a bearing section 11, a fastening area 12 and a fastening section 13 for a wiper arm not illustrated. This fastening section 13 has a knurled cone 14 and, adjacent thereto, a threaded section 15 for a fastening nut not illustrated.

A crank arm 20 is non-rotatably linked to wiper shaft 10. At its free end two ball pins 21 are fixed, onto which a drive member (not illustrated) is normally attached. At its opposite end the crank arm 20 has an aperture 22 for receiving wiper shafter 10.

The invention refers to the form of the non-rotatable connection between a first element, which in the present case is the wiper shaft 10, and the crank arm 20, which is fixed approximately midway onto the wiper shaft 10. Accordingly, the fastening area 12 is located between the bearing section 11 and the fastening section 13 for the wiper arm. FIG. 3 shows that diameter D1 of the bearing section 11 of the wiper shaft 10 is slightly bigger than diameter D2 of the fastening area 12. Thus an arresting flange 30 is formed which more or less separates [being] bearing section 11 from fastening area 12.

Fastening area 12 is provided with knurled sections 31a and 31b, occupying an axial length L, which is smaller than the thickness D of crank arm 20. In FIG. 3 the two knurled sections 31a, 31b of different axial lengths can be seen, whereby section 31a next to the arresting flange 30 is approximately twice as long as section 31b. Between these two knurled sections 31a, 31b, a ring-groove 16 having a generally half-circle cross-section is formed in the wiper shaft. This ring-groove 16 cooperates with a holding element or bulge 23 formed out of the crank arm 20. Crank arm 20 has, concentrically to the wiper shaft 10 and the aperture 22, a ring-like recess 24 on its one front side 25, which is produced by a tool with a ring-like die 41. Die 41 acting on the one front side 25 of the crank arm 20 in the direction of Arrow P causes material of the crank arm to be pushed aside in such a way that ring-like recess 24 and, consequently, a bulge, which serves a holding element 23, are created. This bulge serving as holding element 23 is radially pressed out of the outer surface 26 of the aperture 22 in the crank arm 20 and into the ring groove 16 of the wiper shaft 10. Since the radial depth T of this ring-groove 16 is bigger than the radial height H of the bulge, there is no obstacle to pushing the material in the way desired.

FIG. 3 shows that fastening area 12 comprises a ring-groove 16 into which holding element 23 formed out of the crank arm 20, namely bulge 23, engages. Bulge 23 is formed out of the outer surface 26 of the aperture 22 and is not visible in the final product. The crank arm 20 and the wiper shaft 10 are locked together in the axial direction of the wiper shaft because this holding element 23 encloses the wiper shaft like a ring. Because of the different lengths of the knurled sections 31a, 31b, holding element 23 is closer to the one front side 25, where tool 40 is used, than to the opposite front side 27 lying on the arresting flange 30. Thus the material is pushed aside without the need for using excessive pressure on the die. Of course, it has to be taken care that the die is used at the right distance from the wiper shaft. Numerous experiments have shown that the material flows best when the axial distance A1 between holding element 23 and the front side 25 acted upon by the die more or less corresponds to the radial distance R1 between the ring-like recess 24 and the edge of aperture 22 in crank arm 20.

To manufacture the drive unit illustrated in the drawing, the wiper shaft and the crank arm are first produced as separate components. Then the aperture 22 on the crank arm 20 is pressed over the wiper shaft 10, which is formed as a solid shaft, until the one front side 27 lies on the arresting flange 30 of the wiper shaft 10. Next, the die 41 acts on front side 25 in the axial direction of the wiper shaft 10, i.e. in the direction of assembly when putting crank arm 20 and wiper shaft 10 together, and works the ring-like recess 24 into the crank arm 20 to create holding element 23, which radially enters the ring groove 16 of the wiper shaft 10, by pushing the respective material aside. Thus without any further operational step a non-rotatable connection between crank arm 20 and wiper shaft 10 is provided, which connection meets all requirements and also resists loads in the axial direction.

As to the embodiment illustrated in the drawing, crank arm 20 lies on the arresting flange 30 of the wiper shaft 10. Experiments have shown that this is not absolutely necessary, because the stability created by the holding element engaging into the ring-groove of the wiper shaft is absolutely sufficient for securing the axial position. With respect to an embodiment have no arresting flange, the wiper shaft is provided with two ring-grooves in the fastening area, whereby a holding element in each is formed out of both front sides of the crank arm. Such an embodiment is especially appropriate when the thickness of the crank arm exceeds a certain measure and a sufficient axial length is provided for the knurled sections.

FIG. 4 shows another embodiment of the invention, in which the first element is a pivot pin, namely a double ball pin 110, the fastening area 12 of which is between the two adjacent linking elements 111 and 113. Thus these linking elements 111 and 113 can be compared with the sections 11 and 13 of the wiper shaft 10 because in both cases the fastening area 12 is arranged between the adjacent sections and not at the end of the first element. Since this embodiment of the invention comprises a ring-groove 16 as well as a holding element 23 engaging into it and formed out of the outer surface 26 of the aperture 22 of crank arm 20, this embodiment exactly corresponds to the embodiment according to FIGS. 1 to 3 described above in detail. Therefore no further explanations are needed. However, this embodiment need not be knurled because no significate torque is transferred from the pivot pin to the crank arm.

Figure 5:
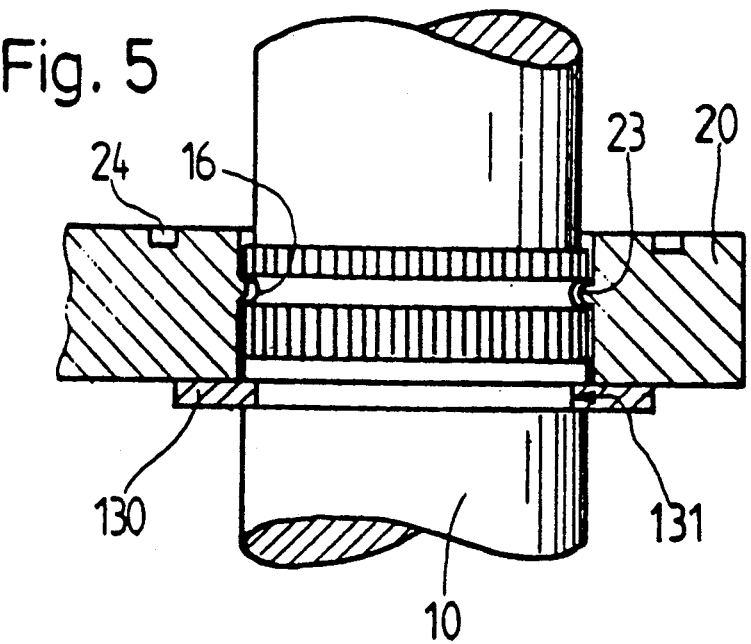
FIG. 5 is a partial sectional view of another embodiment of the driving gear.

FIG. 5 shows another embodiment wherein arresting flange 30 of the first embodiment is replaced by a securing element 130, which is inserted into a ring-groove 131 of the wiper shaft 10. Therefore the wiper shaft can be produced without a ledge or arresting flange 30. With respect to the to other features, this embodiment of the invention corresponds to the embodiments described before.

Finally, it is noted that lower costs can be achieved if both the wiper shaft and the pivot pin are anchored at a crank arm in the way described above, i.e. if they are fixed in the same direction of the assembly.

We claim:

1. A drive unit comprising: a crank arm formed of malleable material defining a through bore and generally parallel front and back surfaces; and an elongate element having an intermediate portion extending through said bore and said elongated element further having a radially extending arresting flange formed thereon, axially abutting said back surface;

said elongate element also having a pair of ends each adjacent a respective one of said front and back surfaces of said crank arm, a ball shaped linking element formed on each end of said elongate element having a radially opening circumferential groove formed therein of a half circular cross sectional shape, said groove disposed within said bore and axially spaced from said front surface, said elongate element formed with first and second annular areas on either side of said circumferential groove, said annular areas each fit into said bore; and wherein crank arm material at said front surface of said crank arm is displaced so as to define an annular recess substantially concentric to said bore and radially spaced outwardly thereof, and material of said crank arm around said bore radially displaced to bulge radially into said half circle cross section of said circumferential groove, thereby forming a holding element axially affixing said crank arm to said elongate element.

* * * * *